United States Patent [19]

DiSalvo et al.

[11] 4,068,849

[45] Jan. 17, 1978

[54] SOLID GOLF BALL

[75] Inventors: Gail D. DiSalvo, Scotch Plains, N.J.; Raymond A. Berard, Portsmouth, R.I.

[73] Assignee: Acushnet Company, New Bedford, Mass.

[21] Appl. No.: 560,868

[22] Filed: Mar. 21, 1975

[51] Int. Cl.² ............................................. C08L 15/00
[52] U.S. Cl. .............................. 273/218; 260/77.5 CR; 260/859 R; 260/998.14; 273/220; 273/235 R; 273/DIG. 10; 273/DIG. 8
[58] Field of Search ........... 260/998.14, 859, 77.5 CR, 260/879; 273/218, DIG. 8, DIG. 10

[56] References Cited

U.S. PATENT DOCUMENTS

| 3,509,234 | 4/1970 | Burlant et al. ..................... 260/859 R |
| 3,660,143 | 5/1972 | Johnson et al. .......... 260/77.5 CR X |
| 3,666,272 | 5/1972 | Walker et al. .................... 260/998.14 |
| 3,678,014 | 7/1972 | Suzuki et al. ................. 260/77.5 CR |
| 3,719,638 | 3/1973 | Huemmer et al. .................. 260/77.5 |
| 3,772,404 | 11/1973 | Knight et al. ..................... 260/859 R |

*Primary Examiner*—Sandra M. Person
*Attorney, Agent, or Firm*—Eyre, Mann, Lucas & Just

[57] ABSTRACT

An improved golf ball is made from a composition comprising an unsaturated elastomer cross linked with a chain comprising the reaction product of a monohydric alkenyl ester and a diisocyanate or a diisothiocyanate.

9 Claims, No Drawings

SOLID GOLF BALL

The present invention relates to golf balls and is more particularly concerned with compositions useful for the production of so-called "solid" golf balls. The composition of the instant invention may be used as the core of a golf ball, the cover of a golf ball or it may be used to make a homogeneous one piece golf ball.

In accordance with the present invention, the composition used in the formation of a golf ball comprises an unsaturated elastomer cross linked with a chain comprising the reaction product of a monohydric alkenyl ester and a diisocyanate or a diisothiocyanate. The combination of chemical functionalities in the cross linking agent is believed to be responsible for the attainment of unexpected properties such as excellent resilience in the cured golf ball.

The elastomers suitable for use in the present invention include the unsaturated polymeric elastomers such as polybutadiene, polyisoprene, and the like and is preferably a polybutadiene having a cis content of at least 40%.

The cross linking agent of the present invention is represented by the following chemical formula:

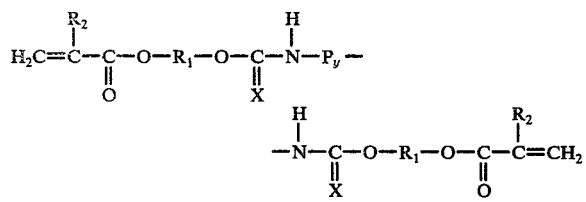

Wherein:
- $R_1$ is any divalent, aliphatic, or cycloaliphatic moiety of up to about 20 carbon atoms or mixtures thereof including heteroatom substituted aliphatic or cycloaliphatic moieties.
- $R_2$ is hydrogen or an alkyl group having up to about 5 carbon atoms.
- $P_y$ is an aliphatic, cycloaliphatic or aromatic moiety of from about 5 to about 20 carbon atoms or is $R_3$—$P_z$—$R_4$ wherein:
  - $R_3$ is an aliphatic, cycloaliphatic or aromatic moiety of from about 5 to about 20 carbon atoms.
  - $R_4$ is an aliphatic, cycloaliphatic or aromatic moiety of from about 5 to about 20 carbon atoms.
  - $P_z$ is an organic polymeric segment selected from the group consisting of polyurethanes, polyureas, polyethers, and polyesters and has a molecular weight of from about 500 to about 5,000.
- X is oxygen or sulfur.

In forming a golf ball according to the present invention, the cross linking agent is suitably grafted onto the unsaturated elastomeric backbone with a free radical initiator such as dicumyl peroxide. In typical formation of the golf ball, the unsaturated elastomer and the cross linking agent are admixed at room temperature and are then heated to a temperature above the melting point of the cross linking agent, suitably about 300° F. for a period of from about 5 to about 15 minutes. The composition is then cooled to below the decomposition temperature of the free radical initiator to be employed after which the free radical initiator is added and mixing is again employed for about 5 to 15 minutes. The mass can then be milled, cast into appropriate form and molded into the shape of a golf ball. The molding of the golf ball is suitably done at temperatures of about 300°-320° F. for about 20-30 minutes. After removal from the mold, the golf balls are suitably post cured at ambient temperatures for about 2 weeks.

The cross linking agent is suitably formed by combining two moles of a monohydric alkenyl ester with each mole of the diisocyanate or diisothiocyanate. The formation of the cross linking agent will normally take place at room temperature but heat and/or initiators can be supplied if desired.

A suitable cross linking agent according to the present invention can be formed by the reaction of two moles of a hydroxylated ester of an acrylic acid such as 2-hydroxyethylmethacrylate with one mole of a diisocyanate such as bis(4-isocyanatophenyl)methane at room temperature thus forming the following cross linking agent:

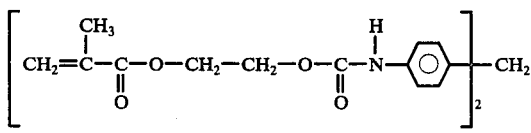

These and other aspects of the present invention may be more fully understood with reference to the following Examples.

EXAMPLE 1

A solid unitary golf ball is made from a composition comprising 100 parts by weight of polybutadiene having a cis 1,4 content of above 90%, 20 parts by weight of a cross linker which is the reaction product of 2-hydroxyethylmethacrylate with bis(4-isocyanatophenyl) methane, 55 parts by weight of zinc dimethacrylate and 3 parts of dicumyl peroxide. The golf ball is molded at a temperature between 300°-320° F. for about 25 minutes. The finished golf ball has the following physical properties:

| | |
|---|---|
| PGA Compression | 119 |
| Shore C Hardness | 91 |
| Rebound | 56 Inches |
| Initial Velocity (USGA Method) | about 254 feet per second |

EXAMPLE 2

Example 1 is repeated except that bis(4-isothiocyanatophenyl)methane is used in the cross linking agent in place of bis(4-isocyanatophenyl)methane. An acceptable golf ball is obtained.

EXAMPLE 3

Example 1 is repeated except that 12-hydroxydodecylacrylate is used in the cross linking agent in place of the 2-hydroxyethylmethacrylate. An acceptable golf ball is obtained.

EXAMPLE 4

Example 1 is repeated except that the composition of Example 1 is molded as the core of a golf ball of about 1.5 inches in diameter and thereafter a cover of Surlyn resin is applied thereto in known manner by molding two half shells of Surlyn about the core. An acceptable golf ball is obtained.

EXAMPLE 5

A golf ball composition is made as in Example 1 except that the composition rather than being made as a solid unitary golf ball is used as a cover by molding it about a standard wound core. An acceptable golf ball is produced.

EXAMPLE 6

Example 1 is repeated except that 80 parts of cross linking agent are used, no zinc dimethacrylate is employed and 4 parts dicumyl peroxide are used. The golf ball is found to have the following physical. properties:

| PGA Compression | 40 |
|---|---|
| Shore C Hardness | 80 |
| Rebound | 61 Inches |
| Initial Velocity (USGA Method) | about 253 feet per second |

EXAMPLE 7

Example 6 is repeated except that 2,4-toluene diisocyanate is substituted for the bis(4-isocyanatophenyl)methane. An acceptable golf ball is obtained.

EXAMPLE 8

Example 6 is repeated except that 4-chloro-1,3-phenylene diisocyanate is substituted for the bis(4-isocyanatophenyl)methane. An acceptable golf ball is obtained.

EXAMPLE 9

Example 6 is repeated except that dixylylene methane-4,4'-diisocyanate is substituted for the bis(4-isocyanatophenyl)methane. An acceptable golf ball is obtained.

EXAMPLE 10

Example 6 is repeated except that 2-isocyanato-6-isothiocyanato toluene is used in place of the bis(4-isocyanatophenyl)methane. An acceptable golf ball is obtained.

EXAMPLE 11

Example 6 is repeated except that 1,4 cyclohexylene diisocyanate is substituted for the bis(4-isocyanatophenyl)methane. An acceptable golf ball is obtained.

EXAMPLE 12

Example 6 is repeated except that polyisoprene is used as the unsaturated elastomer in place of polybutadiene. An acceptable golf ball is obtained.

EXAMPLE 13

Example 6 is repeated except that polycyclopentene is used in place of polybutadiene. An acceptable golf ball is obtained.

EXAMPLE 14

Example 6 is repeated except that polybutadiene of primarily 1,3 butadiene content is employed in place of the polybutadiene of Example 6. An acceptable golf ball is obtained.

EXAMPLE 15

A golf ball is made as in Example 1 except that 53 parts of cross linking agent are employed, no zinc dimethacrylate is employed, 20 parts of silica are employed as a filler, and the amount of dicumyl peroxide is increased to 4 parts. The finished golf ball has the following physical properties:

| PGA Compression | 42 |
|---|---|
| Shore C Hardness | 81 |
| Rebound | 61 Inches |
| Initial Velocity (USGA Method) | about 251 feet per second |

It will be understood that the claims are intended to cover all changes and modifications of the preferred embodiments of the invention, herein chosen for the purpose of illustration, which do not constitute departure from the spirit and scope of the invention.

What is claimed is:

1. A golf ball comprising at least in part a polymerized unsaturated elastomer said polymerized unsaturated elastomer being cross linked by a compound having the formula:

$$H_2C=\underset{\underset{R_2}{|}}{C}-\underset{\underset{O}{\|}}{C}-O-R_1-O-\underset{\underset{X}{\|}}{C}-\underset{\underset{H}{|}}{N}-P_y-$$

$$-\underset{\underset{H}{|}}{N}-\underset{\underset{X}{\|}}{C}-O-R_1-O-\underset{\underset{O}{\|}}{C}-\underset{\underset{R_2}{|}}{C}=CH_2$$

wherein:
$R_1$ is any divalent, aliphatic, or cycloaliphatic moiety of up to about 20 carbon atoms or mixtures thereof including heteroatom substituted aliphatic or cycloaliphatic moieties;
$R_2$ is hydrogen or an alkyl group having up to about 5 carbon atoms;
$P_y$ is an aliphatic, cycloaliphatic or aromatic moiety of from about 5 to about 20 carbon atoms or is $R_3-P_z-R_4$ wherein:
$R_3$ is an aliphatic, cycloaliphatic or aromatic moiety of from about 5 to about 20 carbon atoms;
$R_4$ is an aliphatic, cycloaliphatic or aromatic moiety of from about 5 to about 20 carbon atoms;
$P_z$ is an organic polymeric segment selected from the group consisting of polyurethanes, polyureas, polyethers, and polyesters and has a molecular weight of from about 500 to about 5,000.
X is oxygen or sulfur.

2. The golf ball of claim 1 wherein the elastomer is polybutadiene.

3. The golf ball of claim 2 wherein the polybutadiene in its monomeric form has a cis 1,4 content of at least 90%.

4. The golf ball of claim 1 wherein the cross linking agent is the reaction product of a hydroxylated ester of an acrylic acid with a diisocyanate.

5. The golf ball of claim 4 wherein the hydroxylated ester of acrylic acid is 2-hydroxyethylmethacrylate.

6. The golf ball of claim 4 wherein the diisocyanate is bis(4-isocyanatophenyl)methane.

7. The golf ball of claim 1 further comprising zinc dimethacrylate.

8. The golf ball of claim 1 further comprising a filler.

9. The golf ball of claim 8 wherein the filler comprises silica.

* * * * *